US011924347B2

United States Patent
Smets et al.

(10) Patent No.: US 11,924,347 B2
(45) Date of Patent: *Mar. 5, 2024

(54) IDENTITY AUTHENTICATION AND VALIDATION

(71) Applicant: MASTERCARD INTERNATIONAL INCORPORATED, Purchase, NY (US)

(72) Inventors: Patrik Smets, Nijlen (BE); David Anthony Roberts, Warrington (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,765

(22) Filed: Dec. 12, 2022

(65) Prior Publication Data

US 2023/0155833 A1    May 18, 2023

Related U.S. Application Data

(63) Continuation of application No. 16/838,666, filed on Apr. 2, 2020, now Pat. No. 11,528,139.

(30) Foreign Application Priority Data

Apr. 8, 2019   (EP) .................................. 19167933.1

(51) Int. Cl.
  *H04L 9/06*     (2006.01)
  *G06Q 20/38*    (2012.01)
  (Continued)

(52) U.S. Cl.
  CPC ....... *H04L 9/3213* (2013.01); *G06Q 20/3821* (2013.01); *H04L 9/0643* (2013.01); *H04L 63/0876* (2013.01); *H04L 2209/56* (2013.01)

(58) Field of Classification Search
  CPC ... H04L 9/3236; H04L 9/3231; H04L 9/0643; H04L 63/00; H04L 63/0876;
  (Continued)

(56) References Cited

U.S. PATENT DOCUMENTS 7,680,819 B1   3/2010   Mellmer et al.
9,124,433 B2   9/2015   Marien et al.
(Continued)

FOREIGN PATENT DOCUMENTS

CA    2886548 A1    9/2015
EP    3073670 A1    9/2016
(Continued)

OTHER PUBLICATIONS

F. No. K-11020/217/2018-UISAI (Auth-I), Government of India; https://uidai.gov.in/images/resource/UIDAI Circular 11012018.pdf; Jan. 10, 2018; 5 pgs.

(Continued)

*Primary Examiner* — Mohammad A Siddiqi
(74) *Attorney, Agent, or Firm* — Harness, Dickey & Pierce, P.L.C.

(57) ABSTRACT

There is provided an authentication system for validating identity credentials of a user attempting to access a resource provided by a remote resource provision system. The authentication system includes an input configured to receive, from the resource provision system, an authentication request comprising a cryptographic representation of digital identity data of the user and an associated token identifier, where the digital identity data comprises at least one image of an identity credential of the user. The system also includes a processor configured to: determine a pre-stored cryptographic identifier corresponding to the token identifier; and compare the received cryptographic representation with the pre-stored cryptographic identifier. The
(Continued)

US 11,924,347 B2

Page 2 system further includes an output configured to transmit, to the remote resource provision system and in response to determining a match between the received cryptographic representation and the pre-stored cryptographic identifier, an authentication confirmation indicating successful validation of the digital identity data.

16 Claims, 6 Drawing Sheets

(51) Int. Cl.
    *H04L 9/32*           (2006.01)
    *H04L 9/40*           (2022.01)
(58) Field of Classification Search
    CPC .............. H04L 9/3213; H04L 2209/56; G06Q 20/3827; G06Q 20/3821; G06Q 20/32; G06Q 20/3674; G06Q 20/4014; G06Q 20/3278; G06F 21/36; G06F 21/6245; G06F 21/32
    See application file for complete search history.

(56) References Cited

U.S. PATENT DOCUMENTS

| | | | |
|---|---|---|---|
| 9,519,901 B1* | 12/2016 | Dorogusker | G06Q 20/3226 |
| 9,635,000 B1 | 4/2017 | Muftic | |
| 9,992,022 B1 | 6/2018 | Chapman et al. | |
| 10,454,677 B1 | 10/2019 | Nagelberg et al. | |
| 10,476,862 B2 | 11/2019 | Kamal | |
| 11,122,036 B2 | 9/2021 | Bhatt et al. | |
| 11,528,139 B2* | 12/2022 | Smets | G06Q 20/3827 |
| 11,663,595 B1 | 5/2023 | Houseworth et al. | |
| 2002/0100803 A1 | 8/2002 | Sehr | |
| 2003/0163708 A1 | 8/2003 | Tang | |
| 2006/0000892 A1 | 1/2006 | Bonelle et al. | |
| 2006/0157559 A1 | 7/2006 | Levy et al. | |
| 2006/0229979 A1 | 10/2006 | Sato et al. | |
| 2007/0208869 A1 | 9/2007 | Adelman et al. | |
| 2007/0214093 A1 | 9/2007 | Colella | |
| 2007/0250704 A1 | 10/2007 | Hallam-Baker | |
| 2008/0256594 A1 | 10/2008 | Satish et al. | |
| 2009/0164526 A1 | 6/2009 | Hayashi | |
| 2009/0327144 A1 | 12/2009 | Hatter et al. | |
| 2011/0191829 A1 | 8/2011 | Fischer et al. | |
| 2011/0289318 A1 | 11/2011 | Zhang et al. | |
| 2013/0226813 A1 | 8/2013 | Voltz | |
| 2014/0068722 A1 | 3/2014 | Hayat | |
| 2014/0101453 A1 | 4/2014 | Senthurpandi | |
| 2014/0189808 A1 | 7/2014 | Mahaffey et al. | |
| 2014/0279516 A1 | 9/2014 | Rellas et al. | |
| 2014/0279519 A1 | 9/2014 | Mattes et al. | |
| 2014/0282884 A1* | 9/2014 | Bao | G06F 21/316 726/4 |
| 2015/0038118 A1 | 2/2015 | Berteau et al. | |
| 2015/0059003 A1 | 2/2015 | Bouse | |
| 2015/0295906 A1 | 10/2015 | Ufford et al. | |
| 2015/0319170 A1 | 11/2015 | Grossemy | |
| 2015/0356523 A1 | 12/2015 | Madden | |
| 2016/0210621 A1 | 7/2016 | Khan | |
| 2016/0239653 A1 | 8/2016 | Loughlin-Mchugh et al. | |
| 2016/0300236 A1 | 10/2016 | Wiley et al. | |
| 2016/0328713 A1 | 11/2016 | Ebrahimi | |
| 2016/0330027 A1 | 11/2016 | Ebrahimi | |
| 2016/0330035 A1 | 11/2016 | Ebrahimi et al. | |
| 2016/0364703 A1 | 12/2016 | Bhatt et al. | |
| 2016/0364730 A1 | 12/2016 | Rans et al. | |
| 2017/0022814 A1 | 1/2017 | Ervin | |
| 2017/0111175 A1 | 4/2017 | Oberhauser et al. | |
| 2017/0201498 A1 | 7/2017 | Baig et al. | |
| 2017/0213211 A1 | 7/2017 | Sibert et al. | |
| 2017/0222814 A1 | 8/2017 | Oberhauser et al. | |
| 2017/0250972 A1 | 8/2017 | Ronda et al. | |
| 2017/0257358 A1 | 9/2017 | Ebrahimi et al. | |
| 2017/0316409 A1 | 11/2017 | Smith et al. | |
| 2018/0048864 A1 | 2/2018 | Taylor et al. | |
| 2018/0068173 A1 | 3/2018 | Kolleri | |
| 2018/0137512 A1 | 5/2018 | Georgiadis et al. | |
| 2018/0165781 A1 | 6/2018 | Rodriguez et al. | |
| 2018/0173871 A1 | 6/2018 | Toth | |
| 2018/0181964 A1* | 6/2018 | Zagarese | G06Q 20/40145 |
| 2018/0204191 A1 | 7/2018 | Wilson et al. | |
| 2018/0288033 A1* | 10/2018 | Kamal | G06Q 20/4014 |
| 2018/0351747 A1 | 12/2018 | Spangemacher et al. | |
| 2019/0087825 A1 | 3/2019 | Bhatt et al. | |
| 2019/0089702 A1 | 3/2019 | Bhatt et al. | |
| 2019/0166118 A1* | 5/2019 | Lee | H04W 12/06 |
| 2019/0190724 A1 | 6/2019 | Sundaresan et al. | |
| 2019/0230496 A1 | 7/2019 | Wane | |
| 2019/0245693 A1 | 8/2019 | Iyer et al. | |
| 2019/0333054 A1 | 10/2019 | Cona et al. | |
| 2020/0007322 A1 | 1/2020 | Weldemariam et al. | |
| 2020/0076795 A1 | 3/2020 | Kamal | |
| 2020/0374129 A1 | 11/2020 | Dilles et al. | |
| 2021/0042600 A1 | 2/2021 | Jang | |
| 2021/0319192 A1 | 10/2021 | Rodriguez et al. | |
| 2021/0327547 A1 | 10/2021 | Praszczalek et al. | |
| 2021/0383388 A1 | 12/2021 | Iyer et al. | |
| 2021/0409397 A1 | 12/2021 | Bhatt et al. | |

FOREIGN PATENT DOCUMENTS

| | | |
|---|---|---|
| WO | WO2015/002608 | 1/2015 |
| WO | WO2018/022850 | 2/2018 |

OTHER PUBLICATIONS

Times of India; Use 16-digit virtual No. for KYC; https://timesofindia.indiatimes.com/business/india-business/use-16-digit-virtual-no-for-kyc-fromtoday/articleshow/64810724.cms; web accessed Oct. 2, 2018; 56 pgs.

Economic Times; UIDAI introduces new two-layer security system to improve Aadhaar privacy; https://economictimes.indiatimes.com/news/economy/policy/uidai-introduces-new-two-layersecurity-system-to-improve-aadhaar-privacy/articleshow/62442873.cms; web accessed Oct. 2, 2018; 6 pgs.

"Moving Beyond Social Security Numbers"; Blake Hall; https://medium.com/@blake hall/moving-beyond-social-security-numbers-part-3-283bbf28ce74; Oct. 11, 2017; 5 pgs.

"Are you overlooking toeknization as a data security measure?"; Linda Musthaler; https://www.networkworld.com/article/3002307/security/are-you-overlooking-tokenization-as-adata-security-measure.html; Nov. 6, 2015; 5 pgs.

"Digital Identity—Why Now?"; David G. W. Birch; https://www.paymentsnz.co.nz/.../Digital Identity Seminar Presentation Final.pdf; Jan. 8, 2017; 79 pgs.

"Your guide to UPI—the world's most advanced payments system"; Sasi Desai et al.; https://medium.com/wharton-fintech/your-guide-to-upi-the-worlds-most-advanced-payments-system-b4e0b372bf0b; May 11, 2017; 20 pgs.

"Lessons from the World's Largest e-Identity Program"; procivis; https://procivis.ch/2018/02/13/lessons-from-the-worlds-largest-e-identity-program-indias-aadhaar/; Feb. 13, 2018; 6 pgs.

Times of India; "Treat virtual ID, UID token as Aadhaar number"; https://timesofindia.indiatimes.com/business/india-business/treat-virtual-id-uid-token-as-aadhaar-number-uidai-to-agencies/articleshow/65038574.cms; Jul. 18, 2018; 3 pgs.

Neustar; "Neustar Selected as Digital Identity Solution Partner for Visa's ID Intelligence Ecosystem"; https://www.home.neustar/about-us/news-room/press-releases/2017/VisaIDIntelligence: Oct. 24, 2017; 1 pg.

Crush Crypto; Selfkey ICO Review—Digital Identity Management System; https://crushcrypto.com/analysis-of-selfkey/; Dec. 5, 2017; 6 pgs.

U.S. Appl. No. 16/679,115, filed Nov. 8, 2019, Ashfaq Kamal.
U.S. Appl. No. 15/476,526, filed Mar. 31, 2017, Ashfaq Kamal.
U.S. Appl. No. 16/134,371, filed Sep. 18, 2018, Bhatt et al.

(56) References Cited

OTHER PUBLICATIONS

U.S. Appl. No. 16/134,348, filed Sep. 18, 2018, Bhatt et al.
U.S. Appl. No. 17/473,630, filed Sep. 13, 2021, Bhatt et al.
U.S. Appl. No. 15/891,062, filed Feb. 7, 2018, Iyer et al.
U.S. Appl. No. 17/409,530, filed Aug. 23, 2021, Iyer et al.
U.S. Appl. No. 16/838,666, filed Apr. 2, 2020, Smets et al.
U.S. Appl. No. 18/071,502, filed Nov. 29, 2022, Ashfaq Kamal.

\* cited by examiner

IDENTITY AUTHENTICATION AND VALIDATION

CROSS-REFERENCE TO RELATED APPLICATIONS

This application is a continuation of U.S. patent application Ser. No. 16/838,666 filed on Apr. 2, 2020, which claims the benefit of, and priority to, European Patent Application No. 19167933.1 filed on Apr. 8, 2019. The entire disclosure of each of the above applications is incorporated herein by reference.

FIELD

The present disclosure relates to a system and method for digital identity authentication and validation.

BACKGROUND

This section provides background information related to the present disclosure which is not necessarily prior art.

There exist numerous scenarios in which identity verification and validation for a particular individual is effectively performed manually. In many such cases, identity verification applies when consumers who have purchased goods and/or services, subsequently wish to redeem or otherwise avail themselves of these purchased goods or services, as they are typically still required to provide physical documentation in order to verify their identity at this later time.

For example, a customer who has pre-booked (and in many cases has already paid for) a room in a hotel will, when attempting to check-in to the hotel, be required to provide formal identity documents (e.g. their passport, or an identity card) to verify their identity; these documents are usually requested by the hotel reception staff along with the credit card that was used to book and/or pay for the room. The hotel staff will make and retain a copy of the provided identity documents for their records; this information may also be required to satisfy certain local regulations regarding identity verification.

In another example, a customer who has purchased a ticket for a concert or other event will often be required to present identifying documentation at the entrance to the concert/event venue; this identity documentation is checked against the identity information that was provided in association with the original ticket purchase in order to verify the identity of the person attempting to enter the venue.

This process of physical confirmation of identity documentation is, of course, a time-consuming, inefficient process for both the customer and for the merchant. Furthermore, it requires the customer to be in possession of the physical identifying documents at the time of the identity verification check; this is not always the case.

It is an aim of the present disclosure to address disadvantages associated with the prior art.

SUMMARY

This section provides a general summary of the disclosure, and is not a comprehensive disclosure of its full scope or all of its features. Aspects and embodiments of the disclosure are set out in the accompanying claims.

According to an aspect of the present disclosure, there is provided an authentication system for validating identity credentials of a user attempting to access a resource provided by a remote resource provision system. The authentication system comprises an input, configured to receive, from the resource provision system, an authentication request comprising a cryptographic representation of digital identity data of the user and an associated token identifier, the digital identity data comprising at least one image of an identity credential of the user. The authentication system further comprises a processor configured to determine a pre-stored cryptographic identifier corresponding to the token identifier, and compare the received cryptographic representation with the pre-stored cryptographic identifier. The authentication system further comprises an output configured to transmit, to the remote resource provision system and in response to determining a match between the received cryptographic representation and the pre-stored cryptographic identifier, an authentication confirmation indicating successful validation of the digital identity data.

The above-described system is advantageous as it enables swift and robust validation of an image of an identity credential of a user, using cryptographic methods, without requiring the actual image to be present during the validation process. As the actual image does not need to be transmitted or analysed during the validation process, the associated transmission and processing bandwidth and load are decreased; this means that the validation process can be carried out very quickly (in effectively real-time) and with reduced processing power. Furthermore, as only the cryptographic identifier is pre-stored by the authentication system rather than the image of the identity credential itself, this advantageously decreases the necessary storage space that needs to be provided for each user account, and also ensures that sensitive data (i.e. the digital image credential) is not stored. The use of cryptographic mechanisms to replace the image data also increases the security of the validation process, particularly in combination with the use of a token identifier that is associated with the user in question. The user's details do not need to be transmitted across the network for validation to take place, which reduces the risk of interception by fraudulent third parties.

According to another aspect of the present disclosure, there is provided a resource provision system arranged to verify the identity of a user of a mobile device attempting to access a resource provided by the system. The resource provision system comprises an input configured to receive, from the mobile device, digital identity data of the user and an associated token identifier, the digital identity data comprising at least one image of an identity credential of the user. The resource provision system further comprises a processor configured to generate a cryptographic representation of the digital identity data; and generate an authentication request comprising the cryptographic representation and the token identifier. The resource provision system further comprises an output configured to transmit, to a remote authentication system, the authentication request for validation.

Similar advantages associated with security and speed of validation, described previously in respect of the authentication system are also applicable in respect of the resource provision system. Note that the authentication request, whilst being sent by the resource provision system, need not involve direct communication between the resource provision system and the authentication system, but may involve one or more remote third party servers that are in communication with the resource provision and authentication systems via a processing network or other transaction infrastructure. Furthermore, corresponding additional (optional)

features set out above in respect of the authentication system would also be equally applicable in respect of the resource provision system.

The input of the resource provision system may be further configured to receive, from the remote authentication system and in response to successful validation of the digital identity data by the remote authentication system, an authentication confirmation. The system may be further configured to provide, via the output, confirmation to the mobile device of successful validation of the digital identity data. The system may also be further configured to provide, to the user via their mobile device, access to the resource in response to receiving the authentication confirmation.

The cryptographic representation may correspond to a first hash generated over the digital identity data by the remote resource provision system using a cryptographic hashing algorithm. The cryptographic hashing algorithm could correspond to any one-way hashing algorithm, either keyed or unkeyed, for example, SHA-3 or SHA-256.

Optionally, the pre-stored cryptographic identifier corresponds to a second hash generated, by a remote third party server in a pre-registration process, over the image of the user's identity credential using the cryptographic hashing algorithm. In this case, the user's identity credential image was originally provided (e.g. by the user) to the remote third party server (e.g. an independent identity verification provider) for pre-registration. This pre-registration process involved the remote third party server validating the provided identity credential, and generating a cryptographic hash over the provided identity credential using a cryptographic hashing algorithm. This algorithm is the same as the algorithm that will subsequently be used by the remote resource provider when generating the cryptographic representation of the provided digital identity data. The hash generated by the remote third party server is then provided to the authentication system and stored (i.e. corresponding to the pre-stored cryptographic identifier). Subsequently, if the provided digital identity data matches the originally-verified identity credentials, a match will be obtained as the first and second hashes will be identical to one another. However, any minor change to the provided digital identity data will result in the first and second hashes not matching one another.

In some cases, the identity credential comprises any one of the following: the user's passport, the user's driving license, or the user's identity card. The above-described examples correspond to commonly-used forms of identity credential that are used in many countries and in many different scenarios to verify the identity of a user. Converting these credentials into digital identity data therefore renders the above-described system widely applicable (for example, when verifying the user's identity in border control checks, or when confirming the user's identity and age when they are attempting to access age-specific products/services).

Optionally, the remote resource provision system is a merchant, and the resource is associated with a payment transaction carried out between the user and the merchant. In such cases, the authentication system may be an issuer of a payment device used to carry out the payment transaction. The above-described systems are particularly useful in such situations where the user has carried out a transaction, and the identity verification is carried out by the merchant in order to enable them to determine that the user requesting the purchased goods/services is the correct user who is entitled to receive these purchased goods/services. The payment device may correspond to a payment card used during the transaction. The transaction also provides assurance to the merchant (resource/service provider) of the linkage between the user (i.e. the cardholder) and their payment device (i.e. their payment card).

According to a further aspect of the present disclosure, there is provided a mobile device for verifying the identity of a user attempting to access a resource provided by a remote resource provision system. The mobile device comprises a data store configured to store registered digital identity data of the user, the digital identity data comprising at least one image of an identity credential of the user. The mobile device further comprises a processor configured to retrieve the stored digital identity data upon request; and an output configured to transmit, to the remote resource provision system, the retrieved digital identity data and an associated token identifier for verification of the identity of the user.

Optionally, the processor is further configured to retrieve additional user-identifying information from the data store, and the output is further configured to transmit the retrieved information to the remote resource provision system. Alternatively, it is possible that this additional information may be obtained directly from the user without requiring it to be stored in the data store. This additional user-identifying information may comprise, for example, the name of the user and their date and/or place of birth. Additional or alternative identifying information may be provided, and may include or correspond to information that is typically used during Know-Your-Client (KYC) checks.

In cases where the remote resource provision system is a merchant, and the resource is associated with a payment transaction carried out between the user and the merchant, the processor may be further configured to retrieve additional user-identifying information from the data store, and the output may be further configured to transmit the retrieved information to the remote resource provision system. Furthermore, corresponding additional (optional) features set out above in respect of the authentication system and/or resource provision system would also be equally applicable in respect of the mobile device.

According to a further aspect of the present disclosure, there is provided a method of validating identity credentials of a user attempting to access a resource provided by a remote resource provision system. The method comprises: receiving, from the resource provision system, an authentication request comprising a cryptographic representation of digital identity data of the user and an associated token identifier, the digital identity data comprising at least one image of an identity credential of the user; determining a pre-stored cryptographic identifier corresponding to the token identifier; comparing the received cryptographic representation with the pre-stored cryptographic identifier; and transmitting, to the remote resource provision system and in response to determining a match between the received cryptographic representation and the pre-stored cryptographic identifier, an authentication confirmation indicating successful validation of the digital identity data.

According to another aspect of the present disclosure, there is provided a method of verifying the identity of a user of a mobile device attempting to access a resource provided by a remote resource provision system. The method comprises: receiving, from the mobile device, digital identity data of the user and an associated token identifier, the digital identity data comprising at least one image of an identity credential of the user; generating a cryptographic representation of the digital identity data; generating an authentication request comprising the cryptographic representation and the token identifier; and transmitting, to a remote authentication system, the authentication request for validation.

It will be appreciated that similar benefits and advantages will be associated with the methods as were described previously in association with the systems and servers implementing these methods. In addition, corresponding features as were described above in respect of the systems and devices implementing these methods will also be applicable to the methods themselves.

According to another aspect of the present disclosure, there is provided a mobile device for registering digital identity data of a user. The mobile device comprises an input configured to receive digital identity data of the user, the digital identity data comprising at least one image a of an identity credential of the user; a data store configured to store the received digital identity data; and an output configured to transmit, to a remote server system, the received digital identity data and an associated token identifier for validation and registration.

The remote server system (to which the mobile device is configured to transmit the received digital identity data and associated token identifier) may in fact correspond to a network of multiple remote servers, each one carrying out a different functionality. For example, the transmitted data may be initially provided to a remote specialist identity verification provider that is arranged to validate the image of the user's identity credential. Confirmation of this validation (e.g. a cryptographic identifier generated in association with the image of the identity credential) may then be transmitted subsequently to a different registration system for formal registration and storage. The cryptographic identifier may be stored in association with the token identifier, the latter of which will be used to identify the appropriate cryptographic identifier to be retrieved during a subsequent authentication process. One or more additional intermediate server systems may be provided to facilitate the interactions between the remote server and the registration system.

Optionally, the input of the mobile device may be configured to initially receive the token identifier from a (token) registration system. It can be advantageous for that registration system (particularly if the system will also register the digital identity data for subsequent authentication) to also provide/provision the token identifier to the mobile device prior to the registration of the digital identity data being carried out. This token identifier is used to identify the associated data as originating from that mobile device (and its user) when the data is being transmitted to other remote entities in the network. The token identifier may, in turn, have been obtained by the registration system from another remote entity.

According to another aspect of the present disclosure, there is provided a system for registering digital identity data of a user of a mobile device. This registration system comprises an input configured to receive, from a remote third party server, a cryptographic identifier corresponding to validated digital identity data of a user and a token identifier associated with the user, the digital identity data comprising at least one image of an identity credential of the user; and a data store configured to store the cryptographic identifier in association with the token identifier for subsequent user identity verification.

Similar advantages associated with security and speed of validation, which were described above in respect of the validation process, will also be attributable to the above described registration system and to the mobile device. In particular, the use of the pre-registration process for registering validated digital identity data, and the accompanying generation and storage of cryptographic identifiers, enables the subsequent validation to be performed simply using cryptographic data, rather than needing to transmit, analyse and process the actual image data of the user's identity credentials.

According to a further aspect of the present disclosure, there is provided a method of registering digital identity data of a user of a mobile device, the method comprising: receiving, by an authentication system from a remote third party server, a cryptographic identifier corresponding to validated digital identity data of a user and a token identifier associated with the user, the digital identity data comprising at least one image of an identity credential of the user; and storing, by the authentication system, the cryptographic identifier in association with the token identifier for subsequent user identity verification.

It will be appreciated that similar benefits and advantages will be associated with the methods as were described previously in association with the systems and devices implementing these methods. In addition, corresponding additional (optional) features set out in respect of the above-described systems and devices would also be equally applicable in respect of the respective methods.

Within the scope of this application it is expressly intended that the various aspects, embodiments, examples or alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. One or more embodiments will now be described, by way of example only, with reference to the accompanying drawings, in which.

Figure 1:
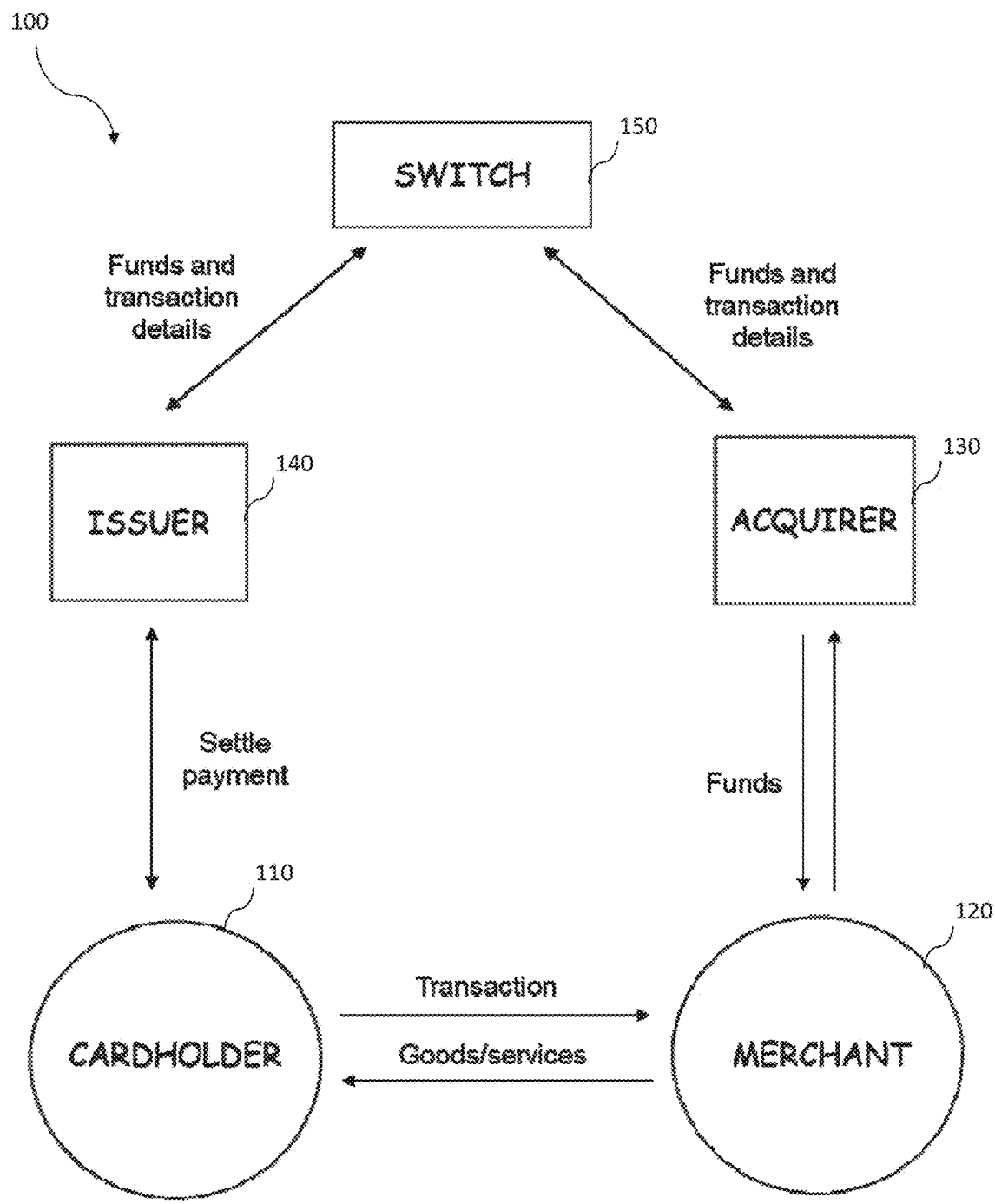
FIG. 1 shows schematically a transaction system using the four-party model.

Where the figures laid out herein illustrate embodiments of the present disclosure, these should not be construed as limiting to the scope of the disclosure. Where appropriate, like reference numerals will be used in different figures to relate to the same structural features of the illustrated embodiments.

DETAILED DESCRIPTION

Embodiments will be described, by way of example only, with reference to the drawings. The description and specific examples included herein are intended for purposes of illustration only and are not intended to limit the scope of the present disclosure.

This document primarily focuses on mechanisms for the authentication and validation of a user's (digital) identity. For example, such digital identity authentication and validation is applicable to users when they are attempting to use/redeem the goods and/or services that they have previously purchased, particularly as the transaction will provide assurance to the goods/service provider of the link between the user and their payment device, and facilitate the identity verification process. However, this is not the only scenario in which digital authentication and validation could be required, and a prior transaction should not be considered a pre-requisite for the implementation of the herein-described systems and methods. Nevertheless, for ease of illustration and understanding, the following detailed description will present the systems and methods of the present disclosure in the context of a use-case involving authentication of the purchaser's digital identity during a post-transaction redemption process. A brief description of a typical transaction scheme, and the entities present in an implementation of such a transaction scheme will therefore now be provided for context.

FIG. 1 is a block diagram of a typical four-party model or four-party payment transaction scheme 100. The diagram illustrates the entities present in the model and the interactions occurring between entities operating in a card scheme. Normally, card schemes (i.e., payment networks linked to payment cards) are based on one of two models: a three-party model or a four-party model (adopted by the present applicant). For the purposes of this document, the four-party model is described in further detail below.

The four-party model may be used as a basis for the transaction network. For each transaction, the model comprises four entity types: cardholder 110, merchant 120, acquirer 130 and issuer 140. In this model, the cardholder 110 purchases goods or services from the merchant 120. The issuer 140 is the bank or any other financial institution that issued the card to the cardholder 110. The acquirer 130 provides services for card processing to the merchant 120. The model also comprises a central switch 150. Interactions between the acquirer 130 and the issuer 140 are routed via the switch 150. The switch 150 enables a merchant 120 associated with one particular bank acquirer 130 to accept payment transactions from a cardholder 110 associated with a different bank issuer 140.

A typical transaction between the entities in the four-party model can be divided into two main stages: authorization, and clearing & settlement. The cardholder 110 initiates a purchase of a good or service from the merchant 120 using their card. Details of the card and the transaction are sent to the issuer 140 via the acquirer 130 and the switch 150 to authorize the transaction. The cardholder 110 may have provided card authentication information in the transaction, and in some circumstances may be required to undergo an additional cardholder verification process to verify their identity. Once the additional verification process is complete the transaction is authorized.

On completion of the transaction between the cardholder 110 and the merchant 120, the transaction details are submitted by the merchant 120 to the acquirer 130 for settlement. The transaction details are then submitted to the relevant issuer 140 by the acquirer 130 via the switch 150. Upon receipt of these transaction details, the issuer 140 provides the settlement funds to the switch 150, which in turn forwards these funds to the merchant 120 via the acquirer 130. Separately, the issuer 140 and the cardholder 110 settle the payment amount between them. In return, a service fee is paid to the acquirer 130 by the merchant 120 for each transaction, and an interchange fee is paid to the issuer 140 by the acquirer 130 in return for the settlement of funds.

In practical implementations of a four-party system model, the roles of a specific party may involve multiple elements acting together. This is typically the case in implementations that have developed beyond a contact-based interaction between a customer card and a merchant terminal to digital implementations using proxy or virtual cards on user computing devices, such as a smart phone. As is discussed below, this may involve some delegation of roles in the three- or four-party model to the transaction infrastructure.

Figure 2:
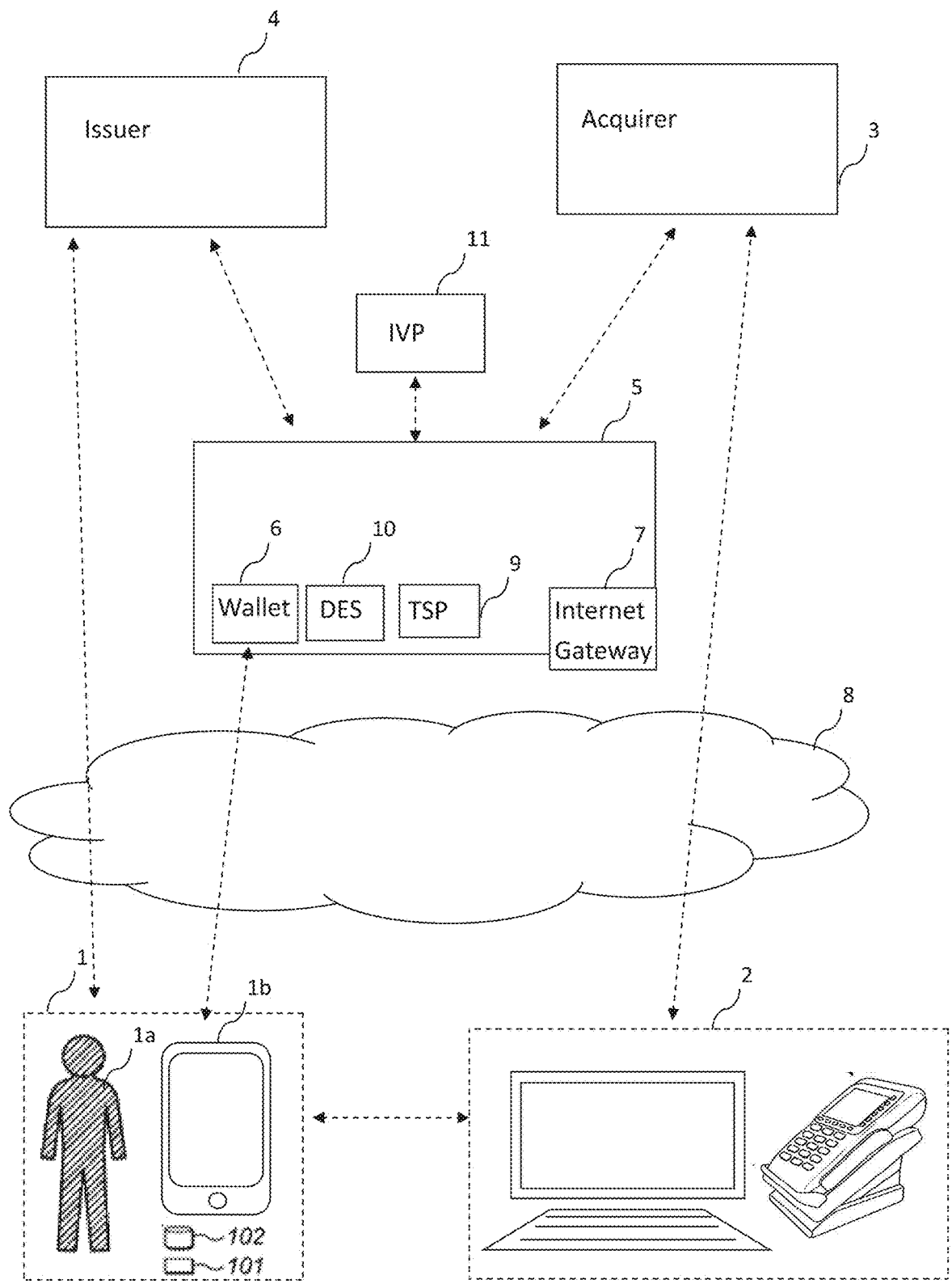
FIG. 2 shows an implementation of the transaction system of FIG. 1 adapted for performing embodiments of the disclosure.

FIG. 2 shows an architecture according to an embodiment of the disclosure appropriate for interaction between a cardholder and a merchant. This figure shows a general purpose architecture for reference, but shows in particular elements of an architecture used when a cardholder's digital identity is authenticated during an interaction with a merchant. The cardholder (also referred to interchangeably herein as a customer) 1*a* is provided with a mobile device 1*b*, for example in the form of a mobile computing device such as a mobile phone or laptop acting as a proxy for a payment card or other transaction device or as a virtual payment card operating only in a digital domain. The mobile device 1*b* may achieve this with a mobile payment application and a digital wallet, as described below. The customer 1*a* and their mobile device 1*b* will also be collectively referred to subsequently in this description as a 'user' using reference numeral 1 (when carrying out interactions with other entities).

The mobile device 1*b* has at least one processor 101 and at least one memory 102 together providing at least one execution environment, as described further below. These devices have firmware and applications (for example, a digital wallet application service) running with an operating system, such as iOS, Android or Windows. Payment devices will typically be equipped with means to communicate with other elements of a payment infrastructure. These communication means may comprise an antenna and associated hardware and software for data communications via a mobile network or local wireless networking using 802.11 protocols, or any combination of the above. The communication means may also incorporate hardware and software to support NFC communications for contactless interactions if so desired.

In the illustrated system, the user 1 communicates with a merchant system (hereafter simply referred to as a 'merchant') 2 to carry out various interactions, for example payment transactions. Such payment transactions may take the form of standard 'bricks and mortar' transactions. Namely, those transactions that are carried out at the merchant's establishment, for example using a Point-of-Sale (POS) device. Alternatively, the cardholder 1*a* may carry out e-commerce transactions with the merchant 2, i.e., payment transactions involving the mobile device 1*b* and a website of the merchant that is accessed using the mobile device 1*b*. During such e-commerce transactions, and usually upon selection of a digital payment mechanism (such as a digital wallet) by the user 1 via the merchant's website, a prompt is provided to the user 1 to authenticate the transaction (e.g. using the mobile device 1*b*). The payment data generated as part of the transaction is subsequently passed to the merchant 2, or to a payment gateway associated with the merchant 2 (not shown). Acquirer 3 and issuer 4 entities are also represented in the system of FIG. 1.

The transaction scheme infrastructure (transaction infrastructure) 5 here provides not only the computing infrastructure necessary to operate the card scheme and provide routing of transactions and other messaging to parties, such as the issuer 4 and the acquirer 3, but also a wallet service 6 to support a digital wallet on the cardholder mobile device 1*b*, and an internet gateway 7 to accept internet-based transactions for processing by the transaction infrastructure 5. Such communications would take place via a communications network 8, such as a public internet. In some embodiments, the wallet service 6 may be provided similarly by a third party with an appropriate trust relationship with the transaction scheme provider. To support tokenization, a token service provider (TSP) 9 is present (again, this is shown as part of transaction infrastructure 5 but may be provided by a third party with appropriate trust relationships), and the transaction scheme infrastructure 5 provides a digital enablement service (DES) 10 to support the performance of tokenized digital transactions, and to interact with other elements of the system to allow transactions to be performed correctly. This digital enablement service may include other elements, such as token service provision. For a tokenized transaction, the transaction is validated in the transaction scheme by mapping the cardholder token to their card PAN, checking the status of the token (to ensure that it is in date and otherwise valid) and any customer verification approach used. This allows the issuer 4 to authorize the transaction in the normal manner. This authorization may be based on input from other entities, such as the TSP 9. In some cases, some or all of this authorization functionality may be delegated to a third party with appropriate trust relationships.

After a transaction has been carried out, as has been previously mentioned, it is often the case that the identity of the customer 1*a* will need to be verified when the customer 1*a* is attempting to access/use the goods and/or services that have been purchased from the merchant 2. For example, where the customer 1*a* has purchased tickets to an event from a merchant 2, or where the customer 1*a* has booked a hotel stay, upon attempting to gain entry to the ticketed event or to check-in to their hotel room, the identity of the customer 1*a* will need to be verified to ascertain that they are in fact entitled to do so. A detailed description of how the customer's identity can be verified during such a post-transaction redemption using embodiments of the present disclosure will now be provided. In such embodiments, an Identity Verification Provider (IVP) 11 is also included in the architecture. This carries out verification of customer identity documentation. It should be noted, however, that the IVP 11 can still be utilized in digital identity authentication use-cases which do not involve a prior transaction having been carried out since as has been previously mentioned, a purchase transaction is not necessarily a pre-requisite for the digital identity authentication and validation to be carried out by the IVP 11. The IVP 11 is shown in FIG. 2 as being separate from the issuer 4 and the transaction scheme infrastructure 5, in order to illustrate that the functionality provided by the IVP 11 is not necessarily dependent upon a transaction having been carried out. However, as will be discussed in greater detail below, the IVP 11 and its associated functionality may be provided in association with aspects of the transaction scheme infrastructure 5, or the issuer 4.

Figure 3:
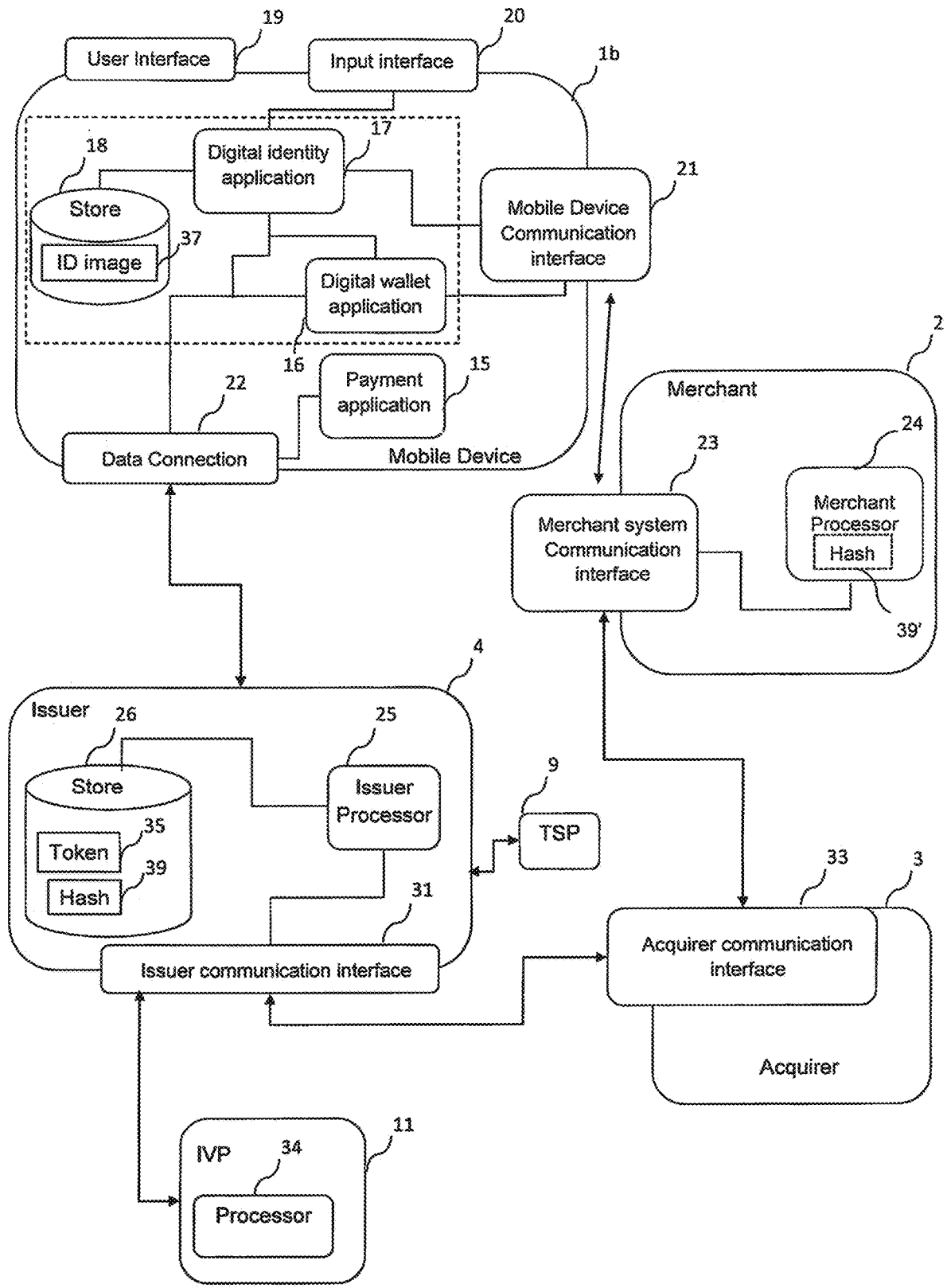
FIG. 3 is a schematic block diagram highlighting elements via which interactions relating to digital identity authentication in embodiments of the disclosure may be implemented.

FIG. 3 shows in detail functional elements suitable for implementing embodiments of the present disclosure relating to authentication of the user's digital identity in a post-transaction context. In these embodiments, the user utilizes their mobile device 1*b* to communicate digital identity information with the merchant system 2. An identity validator, is provided and carries out validation and authentication of the provided digital identity information, and hence of the user's digital identity. In the illustrated embodiment, the issuer 4 plays the role of identity validator and provides this digital identity authentication functionality. The token service provider 9 is also included in FIG. 3, and is shown as a separate entity that is in communication with the issuer 4. However, it will be appreciated that the tokenization functionality associated with the token service provider 9 may be incorporated into and provided by other entities, (not shown) that form part of the overall transaction infrastructure 5. Alternatively, some or all of the token service provider functionality may be provided by the issuer 4 itself, for example, where the issuer 4 corresponds to a card issuing bank. For the remainder of this document, it will therefore be understood that the token service provider 9 and issuer 4 roles may in fact be performed by the same overall entity, such that these two terms may be used interchangeably for referring to this overall entity.

The mobile device 1*b* comprises various applications installed on the device, the applications including a mobile payment application 15, a digital wallet application 16 and a digital identity application 17, which are all implemented in the main operating system of the mobile device 1*b* and are in operative communication with one another. The mobile payment application 15 provides the mobile payment functionality and is actively involved in the data processing associated with such payment transactions. The mobile payment application 15 may comprise multiple sub-modules (not shown) which each carry out different tasks during the transaction interactions, although as the payment transaction processes are not the focus of this application, no further details of these will be provided here. The digital wallet application 16 stores details of the customer 1*a* and information relating to frequently-used payment cards.

The digital identity application 17 provides the support functionality for authentication and validation of digital identity credentials of the customer 1*a*, and further comprises an associated credential data store 18 for storage of registered digital identity credentials. The digital identity application 17 thereby facilitates interactions between the user 1, merchant 2 and the issuer 4 in relation to validation of the customer's 1*a* identity. Although the digital wallet application 16 and digital identity application 17 are shown and described separately here for ease of illustration, it is noted that, in some cases, the digital identity application 17 may actually be provided within the digital wallet application 16, effectively as a sub-application, sub-module or sub-program. Considered another way, the digital wallet application 16 could effectively provide a 'layer' that overlies the digital wallet application 17 (and optionally other payment-related applications). The functionality that is described as being provided by the digital identity application 17 and its associated data store may therefore be provided instead by the digital wallet application 16. This is indicated in FIG. 2 by the dotted lines surrounding these components.

The digital identity application 17 is typically deployed to the mobile device 1b, and provisioned with any necessary data, by the token service provider 9. For example, the digital identity application 17 can be provisioned with one or more tokens, for association with the digital identity credentials received from the user. This enables the provided digital identity credentials to be easily associated with that particular customer 1a and their payment and digital identity accounts, particularly by other entities in the networked transactions system. Although the token provisioning functionality is described as being provided by the token service provider 9, as mentioned earlier, this functionality may instead be incorporated into issuer 4 (or a third party to which some or all of the issuer role has been delegated), such that token provisioning services to the mobile device 1b may instead be provided by one of these entities. It will therefore be appreciated that functionality described subsequently as being provided by the token service provider 9 could alternatively be provided by the issuer 4.

The mobile device 1b further comprises a user interface 19 for enabling user interaction with the various applications, and an input interface 20 (for example, a camera) that can be used by the customer 1a to input identity credentials to the digital identity application 17. For example, the customer 1a may scan or otherwise capture an image of one or more identity credential documents (such as a passport, a driving license, or an identity card) using the camera input interface 20, for registration and subsequent storage in the data store 18 by the digital identity application 17.

The mobile device 1b further comprises communication and data connection interfaces 21, 22 which are used to communicate data between the various applications installed on the mobile device 1b and the other entities in the networked system. For example, registered digital identity credentials and identifiers may be transmitted from the digital identity application 17 to the merchant system 2 for subsequent authentication and validation via communication between mobile device communication interface 21 and a merchant system communication interface 23. The provisioning of data from the token service provider 9 to the digital identity application 17, as well as communications between the various payment-related applications 15, 16, 17 may occur via data connection 22. The merchant system 2 also comprises one or more processors 24 for carrying out various steps relating to the customer identity validation process.

The issuer 4 comprises one or more processors 25 in communication with one or more data stores 26 (although for the purposes of clarity, only one of each component is shown in FIG. 2). Identifying information relating to the customer 1a, may be stored in the data store 26 for use in subsequent identity validation processes. Data relating to each payment card or payment device issued by the issuer 4 may also be stored in a corresponding customer account in the data store 26, along with information relating to the corresponding customer 1a of the relevant payment card, as well as information relating to transactions carried out by the user 1. This allows the issuer 4 to verify the identity of the customer 1a, and of a transaction carried out by that user 1 if necessary. As previously mentioned, some or all of the issuer functionality may be performed by a third party entity (such as a remote server) as an on-behalf service as appropriate. Such an entity would have the requisite trust relationships and communication channels with the issuer 4 (and any other necessary entities in the transaction infrastructure) to enable this functionality to be implemented.

The IVP 11 is also illustrated in FIG. 3. It is shown in communication with the issuer 4 and comprising one or more processors 34 configured to carry out the various steps involved in the verification and validation of customer identity credentials and documentation. These credentials and documentation are typically routed to the IVP 11 by the mobile device 1b. Although the IVP 11 is shown as being a separate entity from the issuer 4, as was the case with the TSP 9, it is noted that (some or all of) the functionality provided by the IVP 11 could instead be incorporated by the issuer 4.

Figure 4:
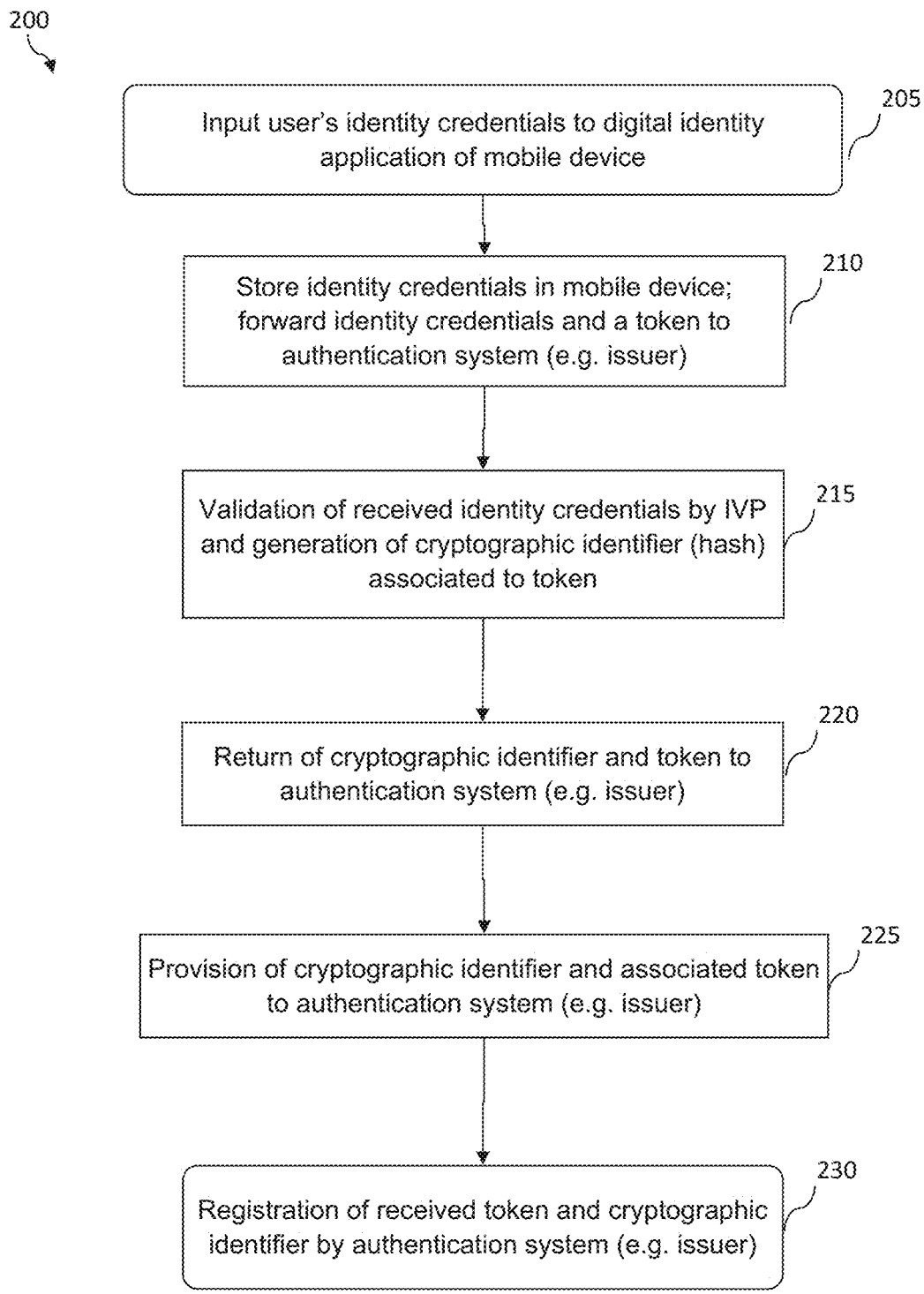
FIG. 4 is a flow chart providing an overview of the steps carried out in an initial identity credential registration process according to an embodiment of the disclosure.
Figure 5:
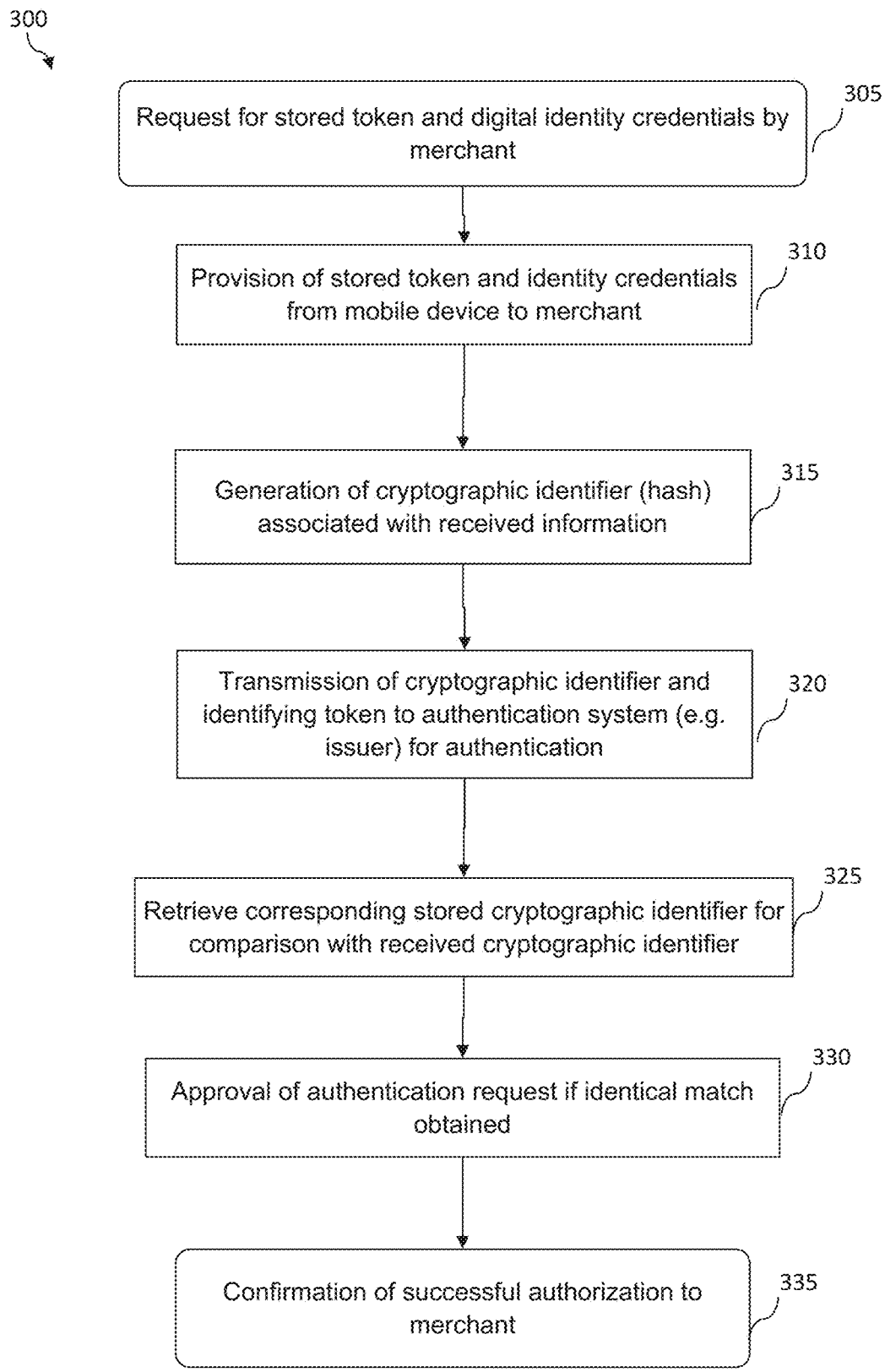
FIG. 5 is a flow chart providing an overview of the steps carried out in a subsequent identity validation and authentication process according to an embodiment of the disclosure.

The system components of FIG. 3 support the implementation of an easy to use digital identity authentication and verification mechanism. FIG. 4 illustrates the steps that are carried out by the various entities in an initial identity credential registration, whilst FIG. 5 illustrates the steps carried out during the subsequent identity validation process, according to embodiments of the disclosure.

Prior to registration and contingent on successful Know-Your Client (KYC) checks having been carried out, an initial provisioning process of the digital identity application 17 is carried out by the issuer 4, in which a token 35 associated with the user 1 is provisioned into the digital identity application 17 in the mobile device 1b. This token 35 will later be used when transmitting identity credential data through the networked system as a means of associating this identity data with that specific user 1. As previously mentioned, the issuer 4 may incorporate the token service provider 9 functionality or may outsource this role to a third party token service provider 9. Aspects of the role of the issuer 4 in this respect may also be delegated to an alternative third party entity with the appropriate trust relationships.

As can be seen from FIG. 4, the main process 200 of identity credential registration begins at Step 205 with the input of customer identity credentials to the mobile device 1b via the input interface 20 and the digital identity application 17. Specifically, this can be carried out by the customer 1a opening the digital identity application 17 on their mobile device 1b, and selecting a registration option. They may then be prompted to provide an image 37 (hereinafter also interchangeably referred to as identity image data) of each identity credential document that is to be registered (e.g. passport, driving license, or identity card). This image may be obtained, for example, by using the camera of the mobile device 1b to capture an image of the required documents. Alternatively, images obtained in an alternative manner (e.g. scanned in by the customer 1a using a different device and sent to the mobile device 1b via email, for example) may also be used.

Next, the digital identity application 17 stores, in Step 210, the provided image(s) 37 in its associated data store 18. In addition, each image 37 is transmitted to the issuer 4, and may be provided together with additional information about the customer 1a that can be used during a subsequent identity verification process. This additional information could overlap with the information used to carry out the initial Know-Your Client (KYC) checks by the issuer, and could include, for example, the customer's name, as well as their date and place of birth, although this does not have to be the case.

Upon receiving the identity image data 37 along with the additional customer identity information, the issuer 4 forwards, in Step 215, this received image data, together with the token 35, and any additional information to the Identity Verification Provider (IVP) 11 for validation. The IVP 11 may constitute an entity (this may be a digital identity specialist provider—one example is IDEMIA) that specializes in validation of (digital) user identity data. The initial identity verification carried out during the registration process is thereby outsourced to an independent specialist identity verification entity.

This initial identity verification process performed by the IVP 11 can be advantageous in two ways: the IVP 11 can be configured to ascertain the authenticity and integrity of the image contained in the digital image credential; and can also be configured to extract information contained within the credential (e.g. passport or driving license numbers) and to validate the extracted information. This provides a robust mechanism for verifying and validating the provided digital identity credential. In ascertaining the authenticity of the image, the IVP 11 may take an active role in credential verification and validation, by determining if a digital identity credential is genuine, valid and has not been tampered with. For example, the IVP 11 can verify that a digital image or scan from a credential (such as a library card) has not been tampered with and has been provided in the genuine format appropriate (e.g. with the correct watermark, or stamps) for that credential. Alternatively, the IVP 11 can simply be configured to ascertain whether the credential has been tampered with but not to check the validity of such a card (i.e. the IVP 11 will not check if the particular form of credential provided actually exists, or if the document submitted was manufactured by a fraudster).

Upon validation of the identity image data 37 and the information contained within the digital identity credential, the IVP 11 generates a cryptographic identifier 39 over the image 37 and the token 35. For example, the cryptographic identifier 39 may be a cryptographic hash that is generated by a one-way cryptographic hashing algorithm (either keyed or unkeyed), for example SHA-3 or SHA-256. This cryptographic identifier will subsequently also be referred to as a 'cryptographic hash' below.

The generated cryptographic hash 39 is returned to the issuer 4 in Step 220 by the IVP 11. The IVP 11 itself will not take a further role in authentication activity as this will be done by another system element acting as an authentication system. This role may be taken by the issuer 4 or can be delegated to an appropriate third party (not represented). This is analogous to transaction authorization by an issuer. In some cases, the relevant step is taken not by the issuer 4 but by another party in the transaction scheme that has a delegated responsibility to do so under predetermined circumstances. Subsequent references to an 'authentication system' can be considered to encompass references to any or all of these appropriate authenticating entities, including the issuer 4. To achieve this, the authentication system receives in Step 225 and registers the received cryptographic hash 39 along with the token 35, for registration of this information within the relevant internal databases (e.g. within data store 26 if the authentication system role is taken by the issuer 4), in association with that particular customer 1a. Finally, the authentication system carries out a registration process in Step 230 which involves linking the received token 35 with the received cryptographic hash 39 for that particular user's specific identity credential provided during the registration process.

The above steps can be repeated subsequently for one or more additional identity credentials. In each case, the above-described steps will be carried out sequentially, and a new cryptographic hash will be generated for association with each identity credential image that is to be registered. The same persistent token 35 may be used for association with each new cryptographic hash that is generated, to associate all of the hashes with the same customer 1a, their mobile device 1b and the corresponding digital identity application 17. Instead of a persistent token, a new token may be generated to be associated with each new cryptographic hash and its associated digital identity credential.

The process of digital identity credential validation, illustrated in FIG. 5, will subsequently be carried out at a later time when the customer 1a is attempting to avail themselves of or otherwise gain access to their previously purchased goods and/or services.

Figure 6:
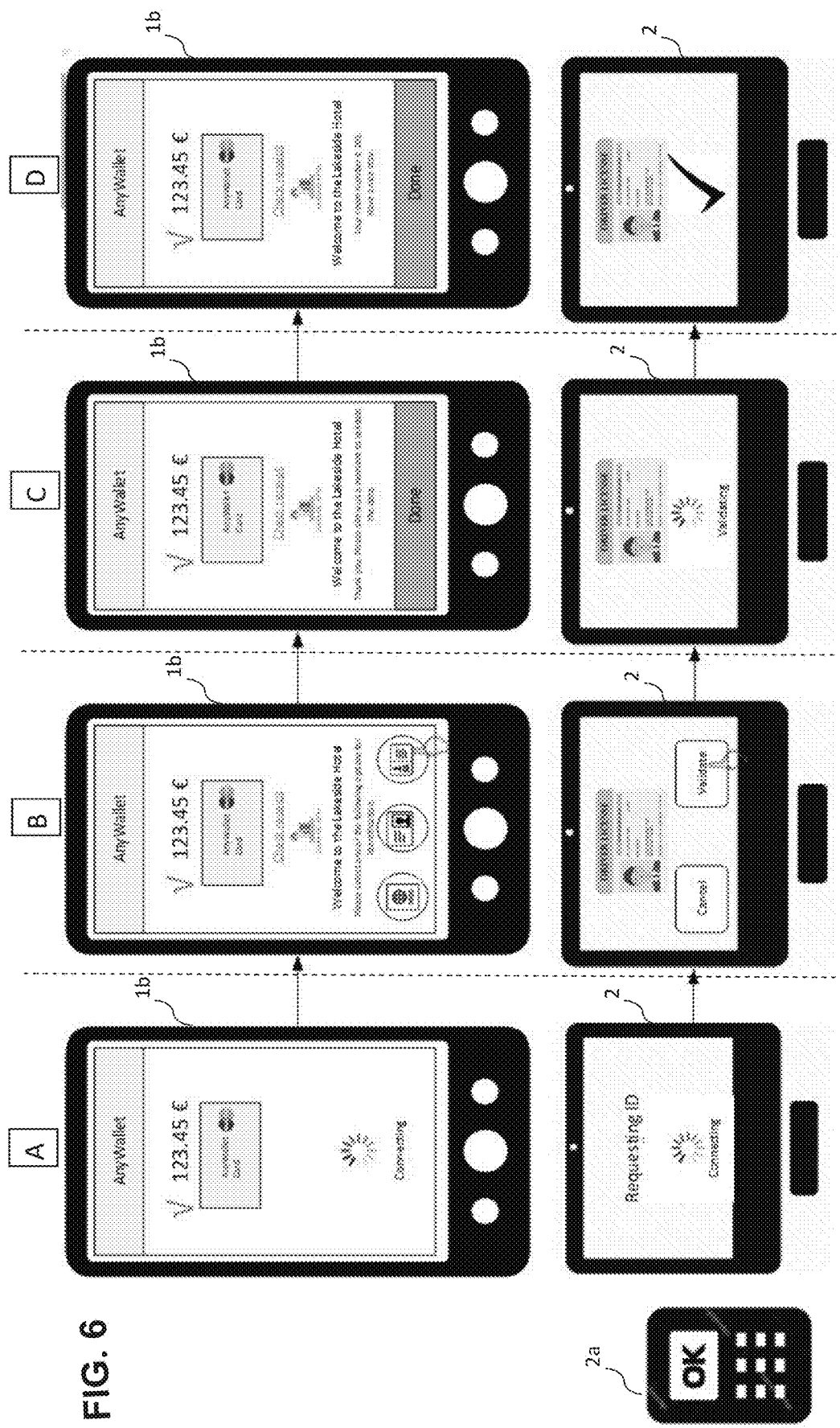
FIG. 6 provides an illustration of the interactions carried out between the user and merchant when implementing the method of FIG. 5, in the specific example of a hotel check-in by the user.

To aid in understanding and visualization of this process, the steps required will be described in conjunction with the images of FIG. 6. This figure contains illustrative screen-shots of what might be displayed to the customer 1a and the merchant 2 on their respective devices when interacting with one another during a digital credential validation process in the specific instance of a hotel check-in. FIG. 6 is divided into four main stages (as indicated by the dotted lines in the figure): Stage A in which the digital identity validation is initiated by the customer 1a; Stage B in which digital identity data is provided by the user 1 to the merchant 2 for validation; Stage C in which the appropriate identity data validation checks are carried out by the issuer 4; and Stage D in which validation has been successfully carried out and check-in is complete.

This process 300 begins when the customer 1a is requested by the merchant 2 to provide their identity credentials in combination with payment card details for identity verification; this starts with Step 305, in which the customer 1a provides these details using their mobile device 1b. In the illustrated example of FIG. 6, in order to initiate the provision of digital identity data, the customer 1a may tap their mobile device 1b on a contactless reader 2a provided by the merchant 2 (e.g. at the check-in desk), and so open the digital wallet application 16. This thereby also enables access to the digital identity application 17 which, as previously mentioned may be provided as a sub-program of the digital wallet application 16, or may be a separate application that is in operative communication with the digital wallet application 16). Alternatively, the customer 1a may select the desired digital wallet application 16 or digital identity application 17 directly on the mobile device 1b (via a conventional touch-screen interface for example). This interaction typically provides cryptographic credentials that allows authentication of the digital identity application 17. The authentication process may be carried out in a manner similar to the authentication of tokenized payment transactions, i.e., through offline data authentication (such as CDA), in combination with online data authentication (such as ARQC—Authentication Request Cryptogram). An offline data authentication is carried out by the merchant 2 at the terminal while an online authentication is performed by or on behalf of the issuer 4, as part of the validation of the digital identity credentials.

As part of this process, the customer 1a may additionally be required to authenticate themselves (to their mobile device 1b) in order to enable the digital wallet application 16 and the digital identity application 17 to be accessed. This may be carried out via a standard user authentication procedure on the mobile device 1b (e.g., fingerprint ID check). Once the customer 1a has been authenticated (e.g., this may be visualized by the merchant 2 via an approval message displayed on the contactless reader 2a), use of the digital wallet application 16 (and thereby also of the digital identity application 17 functionality) is enabled. The token 35 stored by the digital identity application 17 is retrieved by the digital wallet application 16 and provided to the merchant system 2 by the mobile device 1b in order to identify the user 1. As part of this process, details of the payment card used to complete the hotel booking may also be provided to the merchant 2 (in lieu of provision of the physical payment card) if the merchant 2 requests these details. The payment card data may be provided to the merchant 2 by the customer 1a during the contactless tap of the mobile device 1b with the contactless reader 2a, for example via 'tap and connect' functionality, such as that described in pending application WO 2018/022850 by the same applicant. The merchant 2 then requests that one of the previously-registered identity credentials of the customer 1a be provided for validation purposes. The above-described actions correspond generally to the illustrated Stage 'A' in FIG. 6.

The customer 1a then provides, in Step 310, using their mobile device 1b, one of the stored digital identity credentials from the data store 18 of the digital identity application 17 to the merchant 2, via the digital wallet application 16. This is illustrated in Stage 'B' of FIG. 6, where the customer 1a is given the option to select (using the user interface for the digital wallet application 16 in their mobile device 1b) one of the stored pre-registered digital identity credentials: from left to right, these are displayed on the screen of the mobile device 1b as three icons corresponding to a passport, an identity card, and a driving license. The driving license icon in the display is selected by the customer 1a, and the corresponding stored image data 37 of the driving license is retrieved from the data store 18 and transmitted to the merchant 2. This transmission is carried out wirelessly and may be initiated, for example, by an NFC interaction between the mobile device 1b and the contactless reader 2a.

The merchant 2 then initiates the validation process at their end, starting in Step 315, with the generation by the merchant processor 24 of a cryptographic identifier 39' over the received digital identity image data 37 and the token 35. This cryptographic identifier 39' corresponds to a cryptographic hash that is generated using a corresponding cryptographic hashing algorithm to that which was used by the IVP 11 (during the initial registration process 200) to generate the original cryptographic hash 39 over the digital identity credential and the token 35 when they were received from the issuer 4. The generated hash 39' is then transmitted in Step 320, along with the associated token 35 received from the mobile device 1b, to the authentication system (via the acquirer 3) in the form of a digital identity authentication request.

Stage 'C' (the actual validation check) is carried out by the authentication system. This is clear from the corresponding images in FIG. 6 in which both the mobile device 1b and the merchant 2 are shown to be awaiting a response from the authentication system regarding the validation check outcome. During the validation check, the authentication system retrieves in Step 325 the stored cryptographic hash 39 from its internal data store (in the case of the issuer 4, this will correspond to the data store 26), and compares it with the cryptographic hash 39' generated by and received from the merchant 2. The two cryptographic hashes 39, 39' will match if the digital identity image data 37 provided by the mobile device 1b to the merchant 2 is identical to the registered identity image data. In the case of such a match, the authentication system will approve in Step 330 the merchant's authentication request. This may be for authorization of a transaction according to the four-party model if the issuer 4 is acting as the authentication system or it can be a delegation (for example, to token service provider 9 or another third party entity) of this authorization step to provide the authentication result. The use of cryptographic hashes in these checks is useful, since if there is even a small alteration made to the digital identity credentials provided by the mobile device 1b to the merchant 2 (relative to the originally-registered identity credentials), the pre-stored and generated hashes 39, 39' will not match and the authentication request will be declined. This authentication mechanism is more robust, secure and quicker than a side-by-side comparison of two sets of image data would be, particularly since the actual images of the identity credential documents are not transmitted onwards from the merchant 2 to the authentication system (e.g., to the issuer 4).

As an additional aspect of verifying the digital credential, authentication of the digital identity application 17 is carried out. This authentication process will typically be carried out by the same authentication system that verifies the digital credential (e.g., by the issuer 4), with this process being achieved in a manner similar to the authentication of tokenized payment transactions that was described earlier with respect to FIG. 2, and using similar network pathways and protocols. A cryptographic identifier equivalent to a traditional Authentication Request Cryptogram (ARQC) may be generated (e.g., as part of the process of the cardholder 1a accessing the digital identity application 17 and providing the digital identity credential to the merchant 2). This ARQC-equivalent identifier is then authenticated by the authentication system (e.g., the issuer 4), and the authentication response provided subsequently to the merchant 2 may take a form equivalent to an authorization response code (ARC). This authentication process ascertains that the digital credential originates from a genuine device, and also ensures that the provided credential is 'fresh'. The process provides additional cardholder verification, which is particularly useful in cases where the digital identity credential does not actually include an image of the customer 1a. In such cases, the merchant 2 would be relying on issuer 4 performing this authentication to provide the requisite cardholder verification functionality.

Next, as part of Stage D, the authentication request approval is subsequently transmitted back from the authentication system to the merchant 2 in Step 335, to provide confirmation of successful authorization. Receipt of this confirmation will inform the merchant 2 that the image data provided by the user 1 is valid and reliable; it will also inform the merchant 2 that the person presenting the digital image is the actual 'owner' of the identity credentials and any data included in it. Subsequently, the merchant 2 confirms the successful authentication and validation of the digital identity credentials to the user 1, for example (as may be seen in FIG. 6), the merchant 2 may provide a confirmation of authentication success to the mobile device 1b for display to the customer 1a.

The above-described digital identity validation system and method is advantageous in many ways. It enables a secure digital validation of the customer's identity, and of the identity documents provided by the customer when redeeming their purchased goods and/or services. This digital validation is more robust and reliable, whilst still being able to be completed much more quickly than the physical validation of identity documentation that may be carried out in existing systems.

The system and method described herein is particularly advantageous when applied to the validation of digital identity image data. The actual image data 37 (stored by the mobile device 1b and provided to the merchant 2) is not transmitted onward to the authentication system (e.g., the issuer 4) for use in the validation process; only an identifying token 35 associated with the user 1 and a cryptographic hash 39 corresponding to the image data 37 is transmitted between merchant 2 and issuer 4. Consequently, the bandwidth required to transmit and process the necessary information for validation will be much lower than if the image data were to be transmitted onward between entities in the systems for use in the validation checks and the overall validation time required will be much quicker. Furthermore, as the image data is retained at the merchant 2, the security of this image data is maintained, and it will be more difficult for a third party to gain unauthorized access to this image data via interception of network transmissions.

Many modifications may be made to the above examples without departing from the scope of the present disclosure as defined in the accompanying claims.

As will be appreciated from the foregoing discussions, the above-described system and method are flexible, and suitable for implementation in many different scenarios, not merely in the context of improving hotel check-in procedures. In fact, it is envisioned that these systems and methods could be implemented in a variety of scenarios in which a customer is required to provide identifying documents to verify their identity in order to redeem their purchases.

Take, for example, a scenario where a ticket for a concert, or other event, was purchased by the customer 1a using their payment card. When attempting to gain entry to the concert/ event, the customer 1a may instead utilize the functionality provided by the digital identity application 17 installed on their mobile device 1b to provide digital identity credentials to the 'merchant' 2 (in this case, the event security); these digital image credentials can be forwarded to the appropriate issuer 4 of that payment card to carry out an identity validation check, as described above. A similar process would also apply in a scenario where a customer 1a was issued with a membership card by a merchant entity (e.g., a fitness centre) in return for payment made using their payment card. When verifying their identity to gain entry to the fitness centre facilities, the customer 1a could simply provide their digital identity data to the merchant (and thence to the issuer) for validation, for example, by tapping their mobile device 1b on a reader 2a provided at the fitness centre.

Other instances in which the above-described systems and methods would be applicable include an online check-in process in which the customer could provide digital identity credentials for validation; or in the case of border control checks, where the customer could provide their identity documents digitally via their mobile device. In this latter case, where no payment transactions are made, this provision of digital data does not necessarily have to take place via the digital wallet application 16 on the mobile device 1b, and may instead take place directly via interactions between the customer 1a and the digital identity application 17. However, it may be advantageous for the digital wallet application 16 to still be used in this instance, as it provides a convenient entry-point to the identity verification system.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of validating identity credentials of a user attempting to access a resource provided by a remote resource provision system, the method comprising:
   receiving, by an authentication system, from the remote resource provision system, an authentication request comprising a cryptographic representation of digital identity data of the user, which is generated from a one-way cryptographic hashing algorithm, and an associated token identifier, the digital identity data comprising at least one image of an identity document of the user, the associated token identifier specific to the digital identity data;
   determining, by the authentication system, a pre-stored cryptographic identifier corresponding to the associated token identifier;
   comparing, by the authentication system, the received cryptographic representation with the pre-stored cryptographic identifier; and
   transmitting, by the authentication system, to the remote resource provision system, in response to determining a match between the received cryptographic representation and the pre-stored cryptographic identifier, an authentication confirmation indicating successful validation of the digital identity data.

2. The method of claim 1, wherein the cryptographic representation corresponds to a first hash generated over the digital identity data by the remote resource provision system using the one-way cryptographic hashing algorithm.

3. The method of claim 2, wherein the pre-stored cryptographic identifier corresponds to a second hash generated, by a remote third party server as part of a pre-registration process, over the image of the identity document of the user, using the one-way cryptographic hashing algorithm.

4. The method of claim 1, wherein the identity document comprises any one of the following: a user's passport, a user's driving license, or a user's identity card.

5. The method of claim 1, wherein the remote resource provision system is a merchant, and wherein the resource is associated with a payment transaction carried out between the user and the merchant.

6. The method of claim 5, wherein the authentication system is an issuer of a payment device used to carry out the payment transaction.

7. The method of claim 1, further comprising:
   prior to receiving the authentication request, receiving, from a mobile device, digital identity data of the user and an associated token identifier, the digital identity data comprising at least one image of an identity credential of the user;
   generating, by the remote resource provision system, the cryptographic representation of the digital identity data;
   generating, by the remote resource provision system, the authentication request comprising the cryptographic representation and the associated token identifier; and
   transmitting, by the remote resource provision system, to the authentication system, the authentication request for validation.

8. A system for validating identity credentials of a user attempting to access a resource provided by a remote resource provision system, the system comprising:
   an authentication system including:
      an input configured to receive, from the remote resource provision system, an authentication request comprising a cryptographic representation of digital identity data of the user, which is generated from one-way cryptographic hashing algorithm, and an associated token identifier, the digital identity data comprising at least one image of an identity document of the user, the associated token identifier specific to the digital identity data;
      a processor configured to:
         determine a pre-stored cryptographic identifier corresponding to the associated token identifier; and
         compare the received cryptographic representation with the pre-stored cryptographic identifier; and
      an output configured to transmit, to the remote resource provision system, in response to determining a match between the received cryptographic representation and the pre-stored cryptographic identifier, an authentication confirmation indicating successful validation of the digital identity data.

9. The system of claim 8, wherein the cryptographic representation corresponds to a first hash generated over the digital identity data by the remote resource provision system using the one-way cryptographic hashing algorithm.

10. The system of claim 9, wherein the pre-stored cryptographic identifier corresponds to a second hash generated, by a remote third party server as part of a pre-registration process, over the image of the identity document of the user, using the one-way cryptographic hashing algorithm.

11. The system of claim 8, wherein the identity document comprises any one of the following: a user's passport, a user's driving license, or a user's identity card.

12. The system of claim 8, wherein the remote resource provision system is a merchant, and wherein the resource is associated with a payment transaction carried out between the user and the merchant.

13. The system of claim 12, wherein the authentication system is an issuer of a payment device used to carry out the payment transaction.

14. The system of claim 8, further comprising the remote resource provision system, which includes:
   an input configured to receive, from a mobile device, the digital identity data of the user and the associated token identifier;
   a processor configured to:
      generate the cryptographic representation of the digital identity data; and
      generate the authentication request comprising the cryptographic representation and the associated token identifier; and
   an output configured to transmit, to the authentication system, the authentication request for validation.

15. The system of claim 14, further comprising the mobile device, which includes:
   a data store configured to store the digital identity data of the user;
   a processor configured to retrieve the stored digital identity data and the associated token identifier; and
   an output configured to transmit, to the remote resource provision system, the digital identity data and the associated token identifier.

16. The mobile device of claim 15, wherein the processor of the mobile device is further configured to retrieve additional user-identifying information from the data store, and wherein the output of the mobile device is further configured to transmit the retrieved additional user-identifying information to the remote resource provision system, along with the digital identity data and the associated token identifier.

\* \* \* \* \*